United States Patent
Carroll et al.

(10) Patent No.: US 9,896,228 B2
(45) Date of Patent: Feb. 20, 2018

(54) POLYMER ENCASED SMOKELESS TOBACCO PRODUCTS

(71) Applicant: Altria Client Services LLC, Richmond, VA (US)

(72) Inventors: Andrew Nathan Carroll, Chester, VA (US); Shannon Maxwell Black, Richmond, VA (US); Yan Helen Sun, Midlothian, VA (US); William J. Burke, Nashville, TN (US); Christopher Joseph DiNovi, Ruther Glen, VA (US); David Phillips, Richmond, VA (US); Jason Andrew Macko, Richmond, VA (US); Robert Smith, Glen Allen, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 115 days.

(21) Appl. No.: 14/657,018

(22) Filed: Mar. 13, 2015

(65) Prior Publication Data

US 2015/0257442 A1   Sep. 17, 2015

Related U.S. Application Data

(60) Provisional application No. 61/953,387, filed on Mar. 14, 2014.

(51) Int. Cl.
*B65B 9/10* (2006.01)
*A24F 23/00* (2006.01)
(Continued)

(52) U.S. Cl.
CPC .............. *B65B 9/10* (2013.01); *A24B 13/00* (2013.01); *A24B 15/186* (2013.01); *A24B 15/28* (2013.01);
(Continued)

(58) Field of Classification Search
None
See application file for complete search history.

(56) References Cited

U.S. PATENT DOCUMENTS 2,580,609 A    1/1952   Schur et al.
2,734,509 A    2/1956   Jurgensen, Jr.
(Continued)

FOREIGN PATENT DOCUMENTS

CN    101272703    9/2008
CN    101495002    7/2009
(Continued)

OTHER PUBLICATIONS

"Air knife—Wikipedia, the free encyclopedia", Jan. 27, 2014 (Jan. 27, 2014), XP055196211, Retrieved from the Internet: URL: http://web.archive.org/web/20140127191900/http://en.wikipedia.org/wiki/Air_knife [retrieved on Jun. 16, 2015] the whole document.

(Continued)

*Primary Examiner* — Michael P Rodriguez
(74) *Attorney, Agent, or Firm* — Fish & Richardson P.C.

(57) ABSTRACT

Methods for encasing bodies including smokeless tobacco or a tobacco substitute with a polymeric casing can include coating a compressed body with microfibers, applying tubular casings to compressed bodies, printing netting and webs on compressed bodies, injection molding around compressed bodies, applying a webbing to compressed bodies, placing compressed bodies into a skin forming bath, and including thermoplastic polymers in a compressed body.

16 Claims, 9 Drawing Sheets

(51) Int. Cl.
| | |
|---|---|
| *A24B 13/00* | (2006.01) |
| *B65B 63/02* | (2006.01) |
| *B65B 29/02* | (2006.01) |
| *B05D 3/06* | (2006.01) |
| *B05D 1/00* | (2006.01) |
| *B65B 53/02* | (2006.01) |
| *A24B 15/18* | (2006.01) |
| *A24B 15/28* | (2006.01) |
| *B33Y 10/00* | (2015.01) |

(52) U.S. Cl.
CPC .............. *A24F 23/00* (2013.01); *B05D 1/007* (2013.01); *B05D 3/067* (2013.01); *B65B 29/02* (2013.01); *B65B 53/02* (2013.01); *B65B 63/02* (2013.01); *B33Y 10/00* (2014.12)

(56) References Cited

U.S. PATENT DOCUMENTS

| | | | |
|---|---|---|---|
| 3,354,863 | A | 11/1967 | Reynolds et al. |
| 4,084,627 | A | 4/1978 | Focke et al. |
| 4,090,521 | A | 5/1978 | Elsner |
| 4,205,750 | A * | 6/1980 | Dews .................... B65D 77/06 206/497 |
| 4,380,570 | A | 4/1983 | Schwarz |
| 4,405,688 | A | 9/1983 | Lowery et al. |
| 4,516,590 | A | 5/1985 | Teng |
| 4,526,733 | A | 7/1985 | Lau |
| 4,528,993 | A | 7/1985 | Sensabaugh, Jr. et al. |
| 4,660,577 | A | 4/1987 | Sensabaugh et al. |
| 4,848,373 | A | 7/1989 | Lenkey |
| 4,940,464 | A | 7/1990 | Van Gompel et al. |
| 4,987,907 | A | 1/1991 | Townend |
| 5,063,104 | A | 11/1991 | Robertson et al. |
| 5,146,955 | A | 9/1992 | Steiner et al. |
| 5,372,149 | A | 12/1994 | Roth et al. |
| 5,476,616 | A | 12/1995 | Schwarz |
| 5,528,993 | A | 6/1996 | Vincelli |
| 5,645,790 | A | 7/1997 | Schwarz et al. |
| 6,013,223 | A | 1/2000 | Schwarz |
| 6,207,601 | B1 | 3/2001 | Maurer et al. |
| 6,455,030 | B2 | 9/2002 | Saito et al. |
| 6,716,498 | B2 | 4/2004 | Curro et al. |
| 7,156,937 | B2 | 1/2007 | Provost et al. |
| 7,406,811 | B2 * | 8/2008 | Fresnel .................. B65D 23/14 53/415 |
| 7,465,366 | B2 | 12/2008 | Provost et al. |
| 7,547,469 | B2 | 6/2009 | Provost et al. |
| 7,562,426 | B2 | 7/2009 | Barker et al. |
| 7,666,261 | B2 | 2/2010 | Bailey et al. |
| 7,718,556 | B2 | 5/2010 | Matsuda et al. |
| 7,810,507 | B2 | 10/2010 | Dube et al. |
| 2001/0022988 | A1 | 9/2001 | Schwarz et al. |
| 2004/0038022 | A1 | 2/2004 | Maugans et al. |
| 2004/0038790 | A1 | 2/2004 | Pehmoller et al. |
| 2004/0118421 | A1 | 6/2004 | Hodin et al. |
| 2004/0118422 | A1 | 6/2004 | Lundin et al. |
| 2004/0209540 | A1 | 10/2004 | Schwarz |
| 2005/0056956 | A1 | 3/2005 | Zhao et al. |
| 2005/0178398 | A1 | 8/2005 | Breslin et al. |
| 2005/0196580 | A1 | 9/2005 | Provost et al. |
| 2005/0196583 | A1 | 9/2005 | Provost et al. |
| 2005/0217092 | A1 | 10/2005 | Barker et al. |
| 2005/0244521 | A1 | 11/2005 | Strickland et al. |
| 2006/0191548 | A1 | 8/2006 | Strickland et al. |
| 2006/0264130 | A1 | 11/2006 | Karles et al. |
| 2006/0292271 | A1 | 12/2006 | King |
| 2007/0261707 | A1 | 11/2007 | Winterson et al. |
| 2008/0209586 | A1 | 8/2008 | Nielsen et al. |
| 2008/0302682 | A1 | 12/2008 | Engstrom et al. |
| 2008/0305297 | A1 | 12/2008 | Barker et al. |
| 2008/0308115 | A1 | 12/2008 | Zimmermann |
| 2009/0133703 | A1 | 5/2009 | Strickland et al. |
| 2009/0189319 | A1 | 7/2009 | Kim |
| 2009/0203280 | A9 | 8/2009 | Provost et al. |
| 2009/0256277 | A1 | 10/2009 | Brown et al. |
| 2009/0258099 | A1 | 10/2009 | Brown et al. |
| 2009/0258562 | A1 | 10/2009 | Brown et al. |
| 2010/0018539 | A1 | 1/2010 | Brinkley et al. |
| 2010/0018882 | A1 | 1/2010 | St. Charles |
| 2010/0018883 | A1 | 1/2010 | Patel |
| 2010/0170522 | A1 | 7/2010 | Sun et al. |
| 2010/0242978 | A1 | 9/2010 | Fuisz |
| 2010/0300465 | A1 | 12/2010 | Zimmermann |
| 2011/0036364 | A1 | 2/2011 | Pienemann et al. |
| 2011/0083688 | A1 | 4/2011 | Mishra et al. |
| 2011/0220130 | A1 | 9/2011 | Mua et al. |
| 2012/0024301 | A1 | 2/2012 | Carroll et al. |
| 2012/0031414 | A1 | 2/2012 | Atchley et al. |
| 2012/0031416 | A1 | 2/2012 | Atchley et al. |
| 2012/0103353 | A1 | 5/2012 | Sebastian et al. |
| 2014/0083438 | A1 * | 3/2014 | Sebastian ............... A24B 13/00 131/111 |

FOREIGN PATENT DOCUMENTS

| | | |
|---|---|---|
| CN | 101548797 | 10/2009 |
| CN | 101873809 | 10/2010 |
| CN | 103551046 | 2/2014 |
| DE | 10346649 | 5/2005 |
| EP | 0311364 | 4/1989 |
| EP | 1990448 | 11/2008 |
| EP | 2642556 | 9/2013 |
| GB | 2373988 | 12/2006 |
| JP | H04-91773 | 3/1992 |
| JP | 2002-176964 | 6/2002 |
| JP | 3872341 | 1/2007 |
| JP | 2007-515950 | 6/2007 |
| JP | 2009-203412 | 9/2009 |
| JP | 2012/199034 | 10/2012 |
| KR | 100857523 | 9/2008 |
| WO | WO1995/20432 | 8/1995 |
| WO | WO2001/51701 | 7/2001 |
| WO | WO2005/046363 | 5/2005 |
| WO | WO2005/090653 | 9/2005 |
| WO | WO2005/115180 | 12/2005 |
| WO | WO2007/037962 | 4/2007 |
| WO | WO2008/015573 | 2/2008 |
| WO | WO2009/010878 | 1/2009 |
| WO | WO2009/048522 | 4/2009 |
| WO | WO2009/063010 | 5/2009 |
| WO | WO2009/065459 | 5/2009 |
| WO | WO2010/078437 | 7/2010 |
| WO | WO2010/087921 | 8/2010 |
| WO | WO2011/117751 | 9/2011 |
| WO | WO2011/130414 | 10/2011 |

OTHER PUBLICATIONS

International Preliminary Report on Patentability for PCT/US2011/046625, dated Feb. 14, 2013, 6 pages.
International Preliminary Report on Patentability for PCT/US2011/046636 dated Feb. 14, 2013, 7 pages.
International Search Report and Written Opinion in International Application No. PCT/US2014/028242, dated Jul. 15, 2014, 12 pages.
International Search Report and Written Opinion in International Application No. PCT/US2014/028325, dated Sep. 8, 2014, 12 pages.
International Search Report and Written Opinion in International Application No. PCT/US2014/028389, dated Aug. 4, 2014, 9 pages.
International Search Report and Written Opinion in Internationl Application No. PCT/US2014/028354, dated Jul. 10, 2014, 12 pages.
International Search Report and Written Opinion in PCT/US2011/046636, dated Apr. 12, 2012, 14 pages.
International Search Report and Written Opinion in PCT/US2015/020449, dated Sep. 7, 2015, 13 pages.
International Search Report and Written Opnion in PCT/US2011/046625, dated Apr. 12, 2012, 12 pages.

(56) References Cited

OTHER PUBLICATIONS

International Search Report for Application no. PCT/US2015/020454, dated Jun. 30, 2015, 15 pages.
Invitation to Pay Fees in International Application No. PCT/US2014/028584, dated Sep. 9, 2014, 6 pages.
Rydholm, Pulping Processes, Interscience Publishers, 1967, 51-52.
Tso, 1999, Chapter 1 in Tobacco, Production, Chemistry and Technology, Davis & Nielsen, eds., Blackwell Publishing, Oxford.
Yarin et al., "Upward needleless electrospinning of multiple nanofibers," Polymer, Elsevier Science Publishers B.V, GB, vol. 45, No. 9, Apr. 1, 2004 (Apr. 1, 2004), p. 2977-2980, XP004499264, ISSN: 0032-3861, DOI: 10.1016/J.Polymer.2004.02.066 the whole document.
International Preliminary Report on Patentability and Written Opinion in International Application No. PCT/US2015/020449, dated Sep. 14, 2016, 7 pages.

* cited by examiner

POLYMER ENCASED SMOKELESS TOBACCO PRODUCTS

CROSS REFERENCE TO RELATED APPLICATIONS

This application claims benefit under 35 U.S.C. § 119(e) to U.S. Application No. 61/953,387 filed on Mar. 14, 2014.

WORKING ENVIRONMENT

This disclosure generally relates to polymer encased smokeless tobacco products, polymer encases tobacco substitute products, methods for forming polymeric casings around smokeless tobacco products and tobacco substitute products, and machines for encasing bodies including smokeless tobacco or a tobacco substitute.

Smokeless tobacco is tobacco that is placed in the mouth and not combusted. There are various types of smokeless tobacco including: chewing tobacco, moist smokeless tobacco, snus, and dry snuff. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed between a cheek and gum of an adult tobacco consumer. Snus is a heat treated smokeless tobacco. Dry snuff is finely ground tobacco that is placed in the mouth or used nasally.

Smokeless tobacco can be pouched in a fabric using a pouching machine. In some cases, a method for pouching smokeless tobacco includes flavoring the smokeless tobacco, pouching the flavored smokeless tobacco into a paper or fabric, and then packaging the pouches for delivery to consumers. A conventional pouching machine may form a supply of pouching material around tube, seal the edges of the pouching material to form a tube of pouching material, form a cross-seal to form a bottom of the pouch, deliver an amount of smokeless tobacco through the tube and into the bottom-sealed pouch, move the bottom-sealed pouch off the tube, and form a second cross-seal above the smokeless tobacco to close the pouch. The second-cross-seal can also be used as the bottom seal for a subsequent pouch as the process continues. Individual pouches can be cut at the cross-seals.

SUMMARY

Methods for encasing bodies including smokeless tobacco or a tobacco substitute with a polymeric casing can include coating a compressed body with microfibers, applying tubular casings to compressed bodies, printing netting and webs on compressed bodies, injection molding around compressed bodies, applying a webbing to compressed bodies, placing compressed bodies into a skin forming bath, and including thermoplastic polymers in a compressed body.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

Like reference symbols in the various drawings indicate like elements.

DETAILED DESCRIPTION

Methods and machines provided herein can form polymeric casings around smokeless tobacco, tobacco substitutes, and/or similar materials (e.g., tea). Methods and machines provided herein are adapted to provide encased smokeless tobacco products that can retain the smokeless tobacco material, but provide an adult tobacco consumer with desirable flavor and tactile experience.

In some cases, methods and machines provided herein can encase compressed bodies of smokeless tobacco, a tobacco substitute, or similar material in an elastomeric polymer (e.g., polyurethane). In addition to polyurethane, other suitable elastomeric polymers suitable for methods and machines provided herein include styrenes (including styrene block copolymers), EVA (ethyl vinyl acetate), and/or polyether block amides. In some cases, non-elastomeric polymers can be used in methods and machines provided herein. Suitable non-elastomeric polymers include rayon, polypropylene, polyethylene, polyethylene terephthalate, and cellulose. In some cases, blends and/or composites of multiple polymers can provide suitable elastomeric or non-elastomeric polymeric fiber webs. In some cases, a blend of polyurethane, polypropylene, and styrene can be compounded and used in casings provided herein. In some cases, cellulose mouth dissolvable fibers can be included in the body and/or casing.

Microfiber Casing

Figure 1:
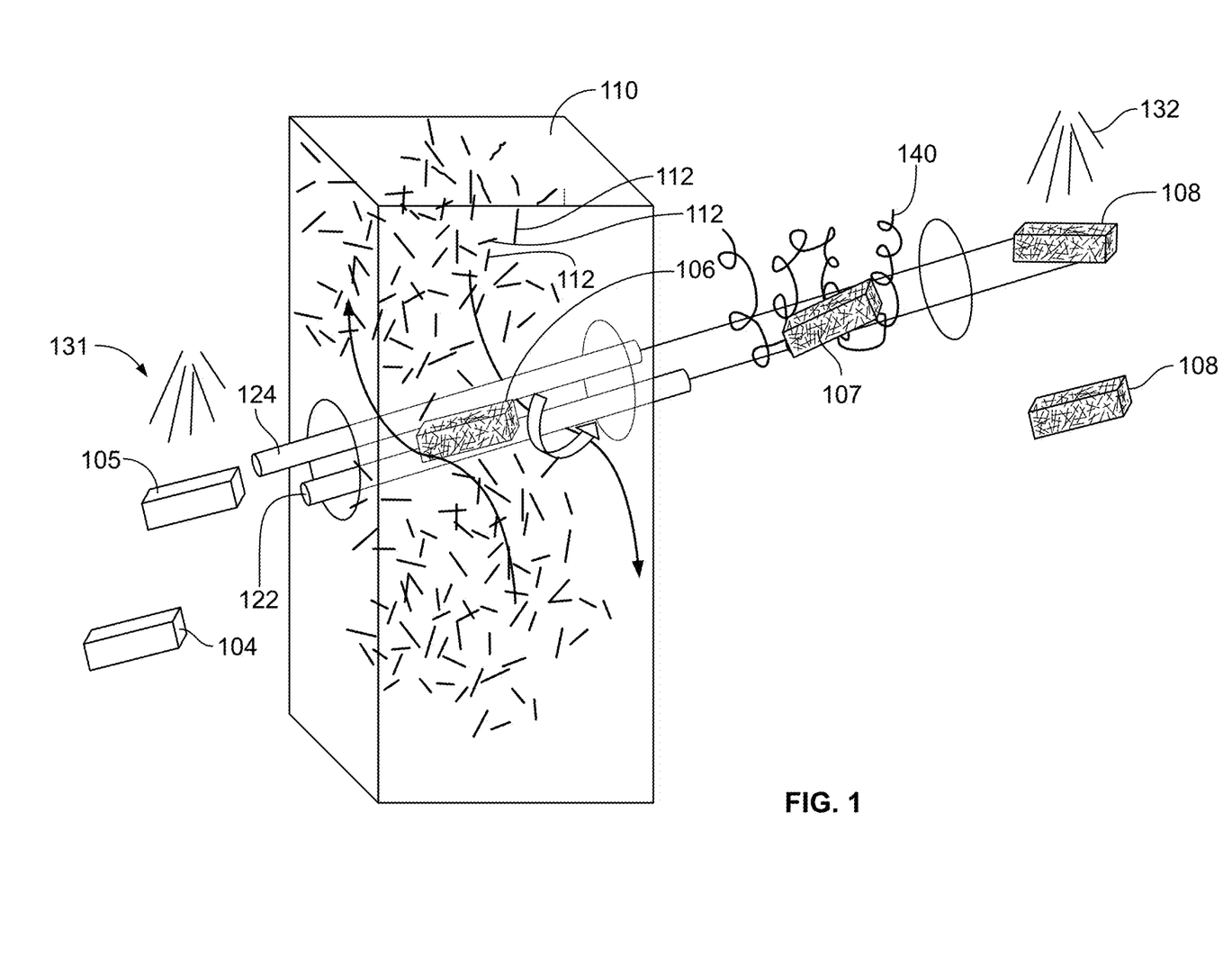
FIG. 1 schematically depicts a method of applying and curing microfibers applied to a body of smokeless tobacco.

In some cases, such as shown in FIG. 1, a casing of polymeric material can be produced by coating a compressed body 104 with microfibers 112 and curing and/or melt bonding the microfibers with a heat source 140 to form a web encased body 108. As shown, a sticky coating or electrostatic charge 131 can be applied to make compressed body 104 a sticky body 105. Sticky body 105 can be introduced into a chamber 110 filled with circulating microfibers 112. While in chamber 110, sticky body 105 can become coated with microfibers to become a covered body 106. Rods 122 and 124 can support bodies passed through chamber 110. Rods 122 and 124 can rotate to cause body 106 to rotate and thus become fully covered in microfibers. In some cases, rods 122 and 124 can be heated. Upon exiting the chamber, covered body 106 can be heated to melt bond and/or cure the microfibers into a continuous network or webbing to form a web encased body 108. In some cases, the heat source 140 can supply IR, UV, and/or convection heat. In some cases, the compressed body can have a reduced oven volatiles content during the process of applying the microfibers. In some cases, the body can have an oven volatiles of less than 60 weight percent prior to applying the microfibers, less than 50 weight percent prior to applying the microfibers, less than 40 weight percent prior to applying the microfibers, less than 30 weight percent prior to applying the microfibers, less than 20 weight percent prior to applying the microfibers, or less than 10 weight percent prior to applying the microfibers. In some cases, a rewetting spray 132 can be applied to raise the oven volatiles to at least 10 weight percent, at least 20 weight percent, at least 30 weight percent, at least 40 weight percent, at least 50 weight percent, or at least 60 weight percent.

Figure 2:
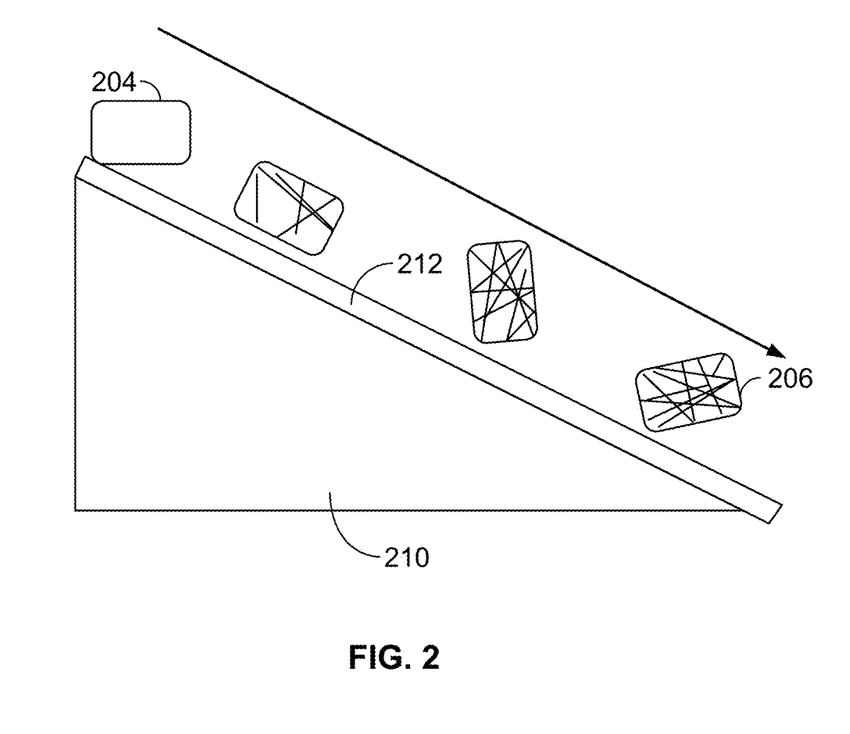
FIG. 2 demonstrates an alternative way to apply microfibers to a body of smokeless tobacco.

FIG. 2 depicts an alternative way of coating a body 202 with microfibers 212 to form a covered body 206. As shown, body 204 can roll/tumble down a sloping surface 210 covered with sticky microfibers 212. In some cases, sloping surface 210 can be adapted to vibrate, which can help convey body 204 down the slope and/or provide random orientation of fibers. Body 204 will accumulate sticky microfibers 212 on its path down the slope. An amount of microfibers accumulated can be based on an amount of sticky microfibers on the surface and the length of the slope. Covered body can be cured and/or melt bonded to form a web encased body as discussed above in reference to FIG. 1.

Mesh Casing

Figure 3:
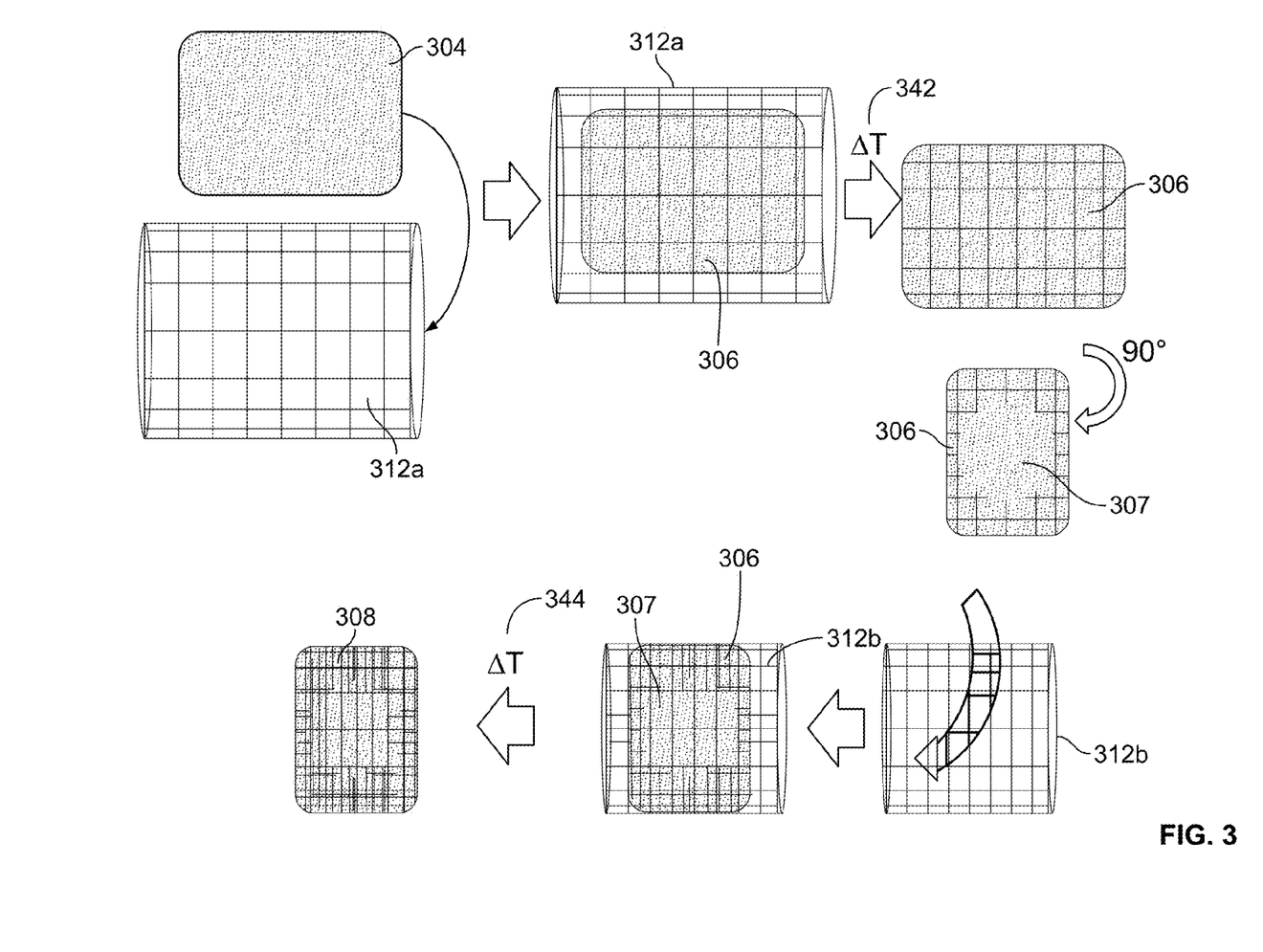
FIG. 3 depicts a method of applying shrink wrap mesh tubes around a compressed body to form an encased body.
Figure 4:
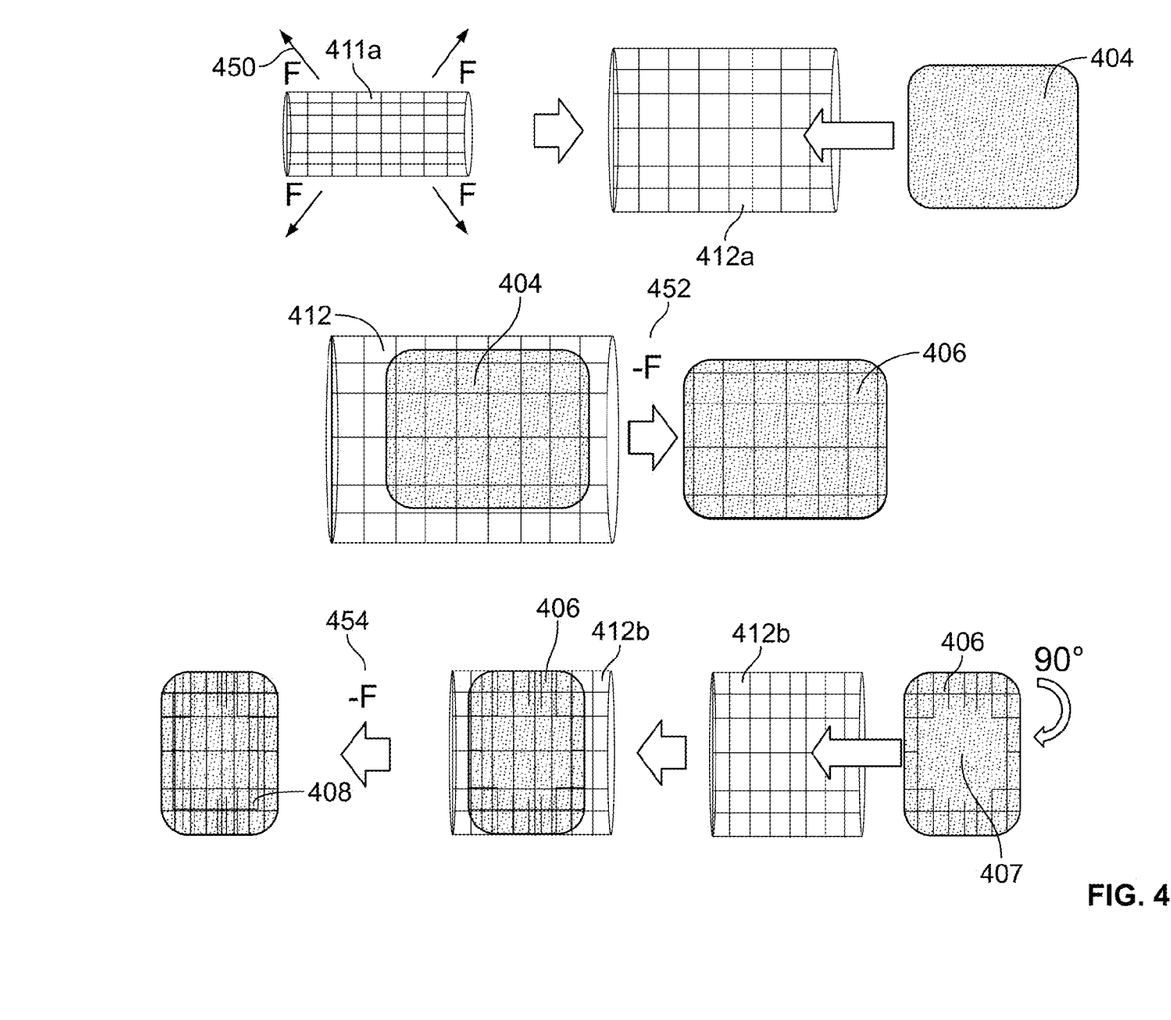
FIG. 4 depicts an alternative method for applying compression mesh tubes around a compressed body to form an encased body.

In some cases, such as shown in FIGS. 3 and 4, a casing of polymeric material can be produced by placing a compressed body 104 within polymeric tubes, reducing the diameter of the tubes, and melt bonding and/or curing the tubes to form a mesh encased body. Referring to FIG. 3, a compressed body 304 can be placed in first mesh tube 312a. First mesh tube 312a can define a plurality of fenestrations. Once positioned in first mesh tube 312a, the diameter of first mesh tube 312a can be reduced. In some cases, as shown in FIG. 3, heat 342 can be applied to reduce the diameter of first mesh tube 312a to produce partially covered body 306 having non-covered ends 307. Partially covered body 306 can be placed in a second mesh tube 312b such that non-covered ends 307 are positioned adjacent to walls of second mesh tube 312b. Heat 344 can again be applied to reduce the diameter of second mesh tube 312b, and optionally to melt-bond the first and second mesh tubes 312a and 312b together, to form mesh encased body 108. Exemplary suitable materials for first and second mesh tubes 312a and 312b include PTFE, FEP, nylon, polyolefins, neoprene, EVA (ethyl vinyl acetate), and PVC.

Referring to FIG. 4, mesh tubes can also be expanded and reduced by mechanical means. As shown in FIG. 4, first mesh tube 411a can be mechanically expanded using force 450 that increases the diameter to form first expanded mesh tube 412a. In some cases, expanding the diameter can reduce the length of the tube. In some cases, first mesh tube 411a can include bands and connectors that are curved such that they can be reversibly plastically or elastically deformed to expand mesh tube. Bands and connectors in mesh tube 411a can define fenestrations there between. Compressed body 404 can be placed in first expanded mesh tube 412a. Once positioned in first expanded mesh tube 412a, the diameter of first expanded mesh tube 412a can be reduced using force 452. In some cases, stretching the length of first expanded mesh tube 412b will reduce the diameter to form partially covered body 406 having uncovered ends 407. In some cases, first expanded mesh tube can be plastically deformed by crimping the first expanded mesh tube 412b. In some cases, first expanded mesh tube 412b is expanded elastically and held in an expanded state until compressed body 304 is in position. Partially covered body 406 can be placed in second expanded mesh tube 412b such that non-covered ends 407 are positioned adjacent to walls of second expanded mesh tube 412b. Force and/or shape memory 454 can be used to reduce the diameter of second expanded mesh tube 412b to create covered body 408. In some cases, heat can be applied to melt-bond the first and second mesh tubes 412a and 412b together. Exemplary suitable materials for first and second mesh tubes 411a and 412b include PE and PP, which can be foamed.

Printed Casing

Figures 5, 6:
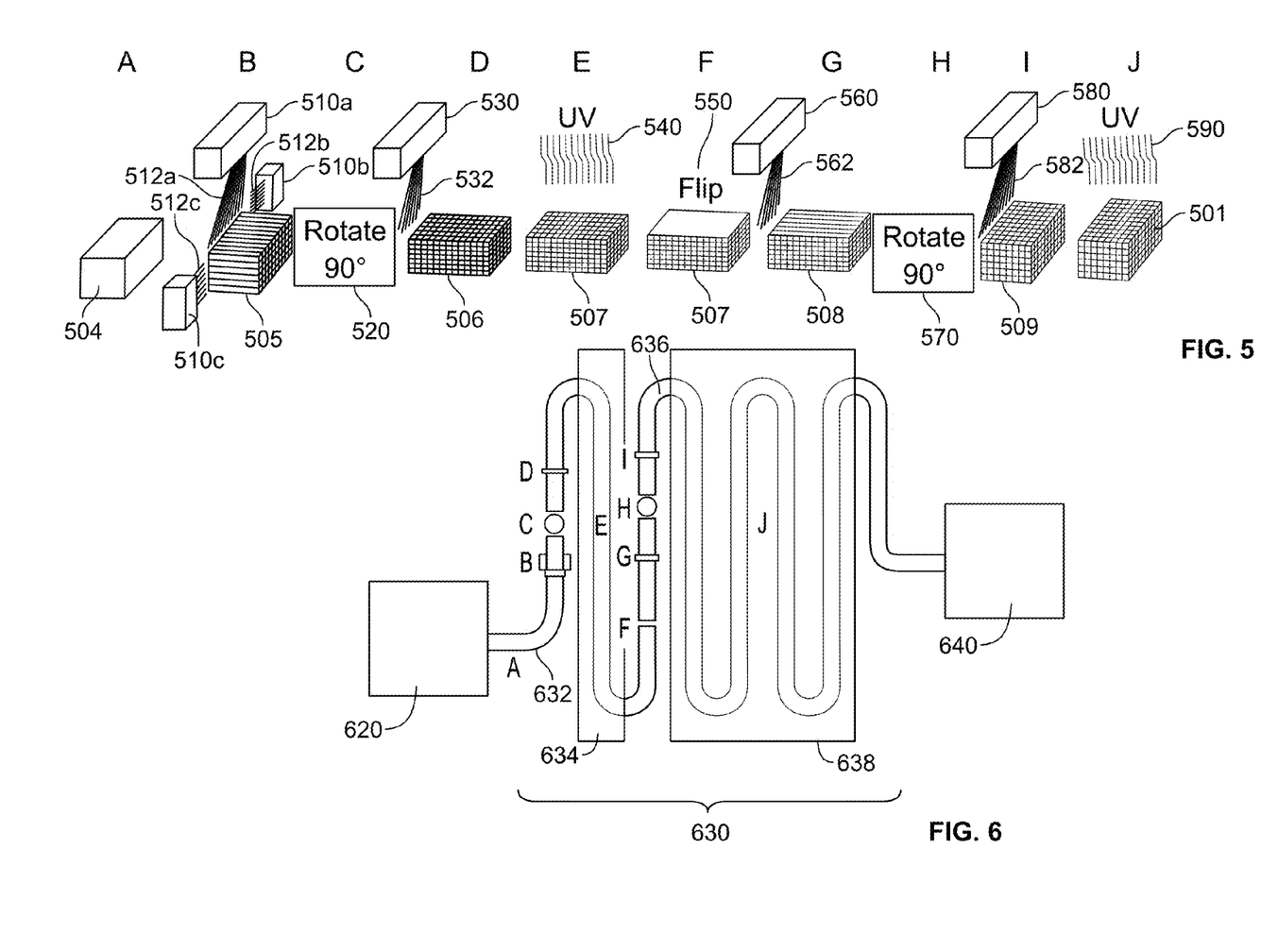
FIG. 5 depicts a method of printing netting on sides of a compressed body.
FIG. 6 depicts an exemplary production line used for the method of FIG. 5.

In some cases, a mesh or web casing can be printed on a compressed body. FIGS. 5 and 6 depict an example of how 3D printers can be used to cover each side of a compressed body 504 with a mesh casing. As shown, 3D printer heads 510a, 510b, and 510c can deposit rows of polymer 512a, 512b, and 512c across a top surface of a body to form a partially covered body 505. Partially covered body 505 can be rotated 90 degrees in step 520 and 3D printer head 530 can print rows of polymer 532 across to the previously deposited rows of polymer to produce partially covered body 506. Partially covered body 506 can be cured (e.g., using UV energy) in step 540 to create cured partially covered body 507. Cured partially covered body 507 can be flipped in step 550 and 3D printer head 560 can print rows of polymer 562 to form partially covered body 508. Partially covered body 508 can be rotated 90 degrees in step 570 and 3D printer head 580 can print rows of polymer 582 across previously deposited rows of polymer 562 to create covered body 509. Covered body 509 can be cured (e.g., using UV energy) in step 590 to mesh cased body 501.

FIG. 6 depicts how the steps of FIG. 5 can be conducted on an assembly line. As shown, a molding device 620 can produce compressed bodies of material (e.g., smokeless tobacco) and deposit them on a conveyor 630 that travels through each process shown in FIG. 5. As shown, a first section of the conveyor 632 deposits a mesh on five of the six sides before partially covered body 506 enters a UV curing zone 634. A second section of the conveyor 636 applies a mesh on a last side of cured partially covered body 507 before covered body 509 enters a second UV curing zone 638 for a final cure. Second curing zone 638 can provide a longer cure than first curing zone 634. In some cases, first curing zone 634 can provide a cure time that lasts about 10 second and second curing zone 638 can provide a cure time that lasts about 40 seconds. Once cured, mesh cased bodies can be packaged in packaging section 640.

In some cases, spray heads can spray an elastomer (e.g., polyurethane) through hot melt nozzles onto a body. The elastomer fibers produced by a hot melt nozzle can air cool on the body to create a fiber encased body.

Injection Molded Casing

Figure 7A:
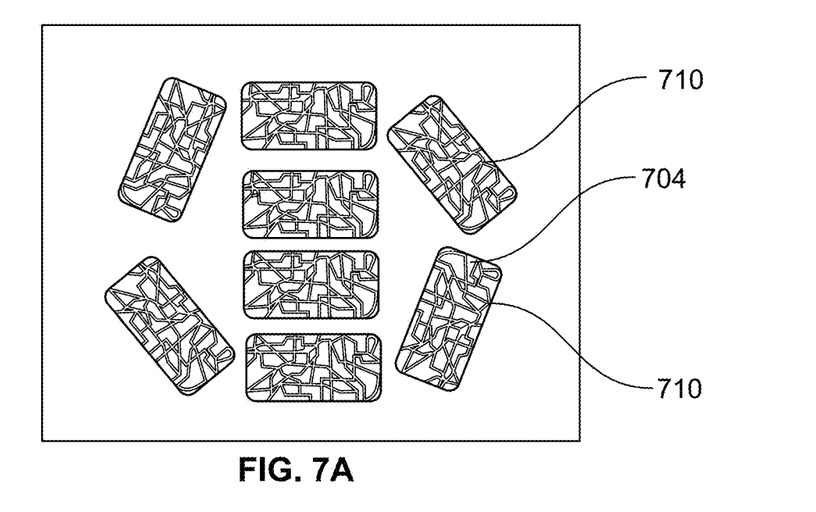
FIG. 7A depicts compressed bodies positioned in a mold.
Figure 7B:
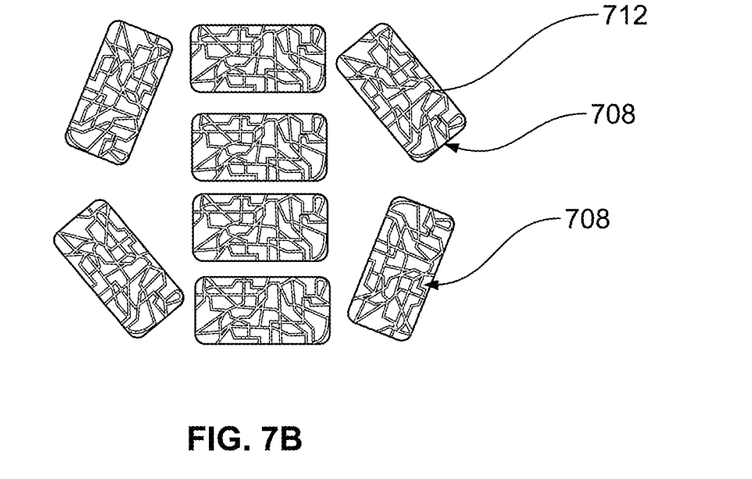
FIG. 7B depicts compressed bodies having polymeric material injected around them in the mold of FIG. 7A.

In some cases, such as shown in FIGS. 7A and 7B, compressed bodies can be inserted into a mold with an inscribed webbing pattern, and material injected around the bodies. For example, recesses 710 can be formed in a mold cavity adapted to receive compressed body 704. After material is injected into the mold cavity, injection molded webbing 712 can remain on the body to form encased bodies 708. In some cases, the injected material can be a foamed material. After the pieces are ejected from the mold with the injection molded webbing, each piece can be air and/or heat cured.

Web Casing

Figure 8:
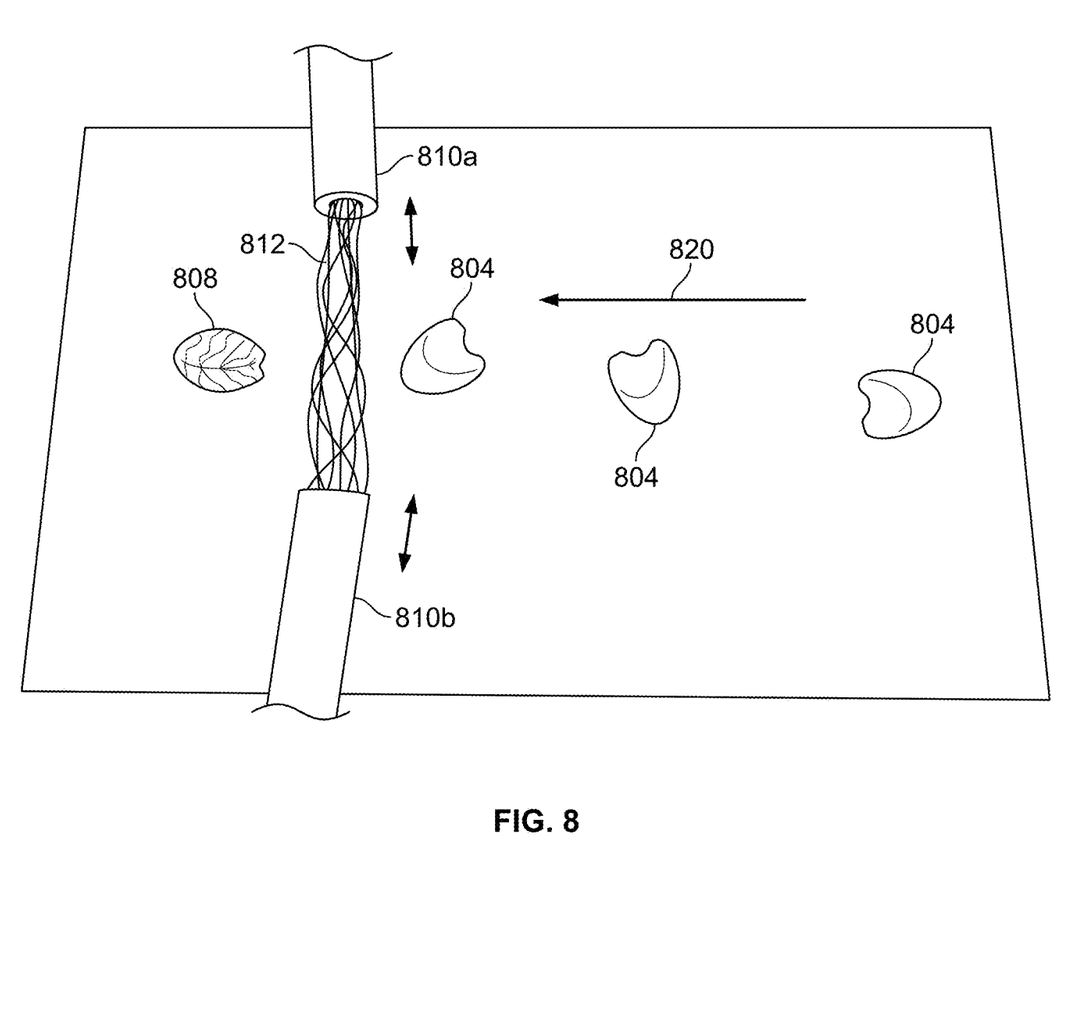
FIG. 8 depicts a method of applying a webbing to a compressed body.

In some case, such as shown in FIG. 8, a non-woven net 812 of sticky fibers can be formed and a body 804 projected 820 at a high speed through the web to form an encased body 808. Net 812 can be formed between two pistons 810a and 810b by placing a sticky fiber material between pistons 810a and 810b and retracting the pistons to form the net 812. Net 812 can have a cob web type appearance. In some cases, encased body 808 is cured.

Foamed Skin Casing

Figure 9A:
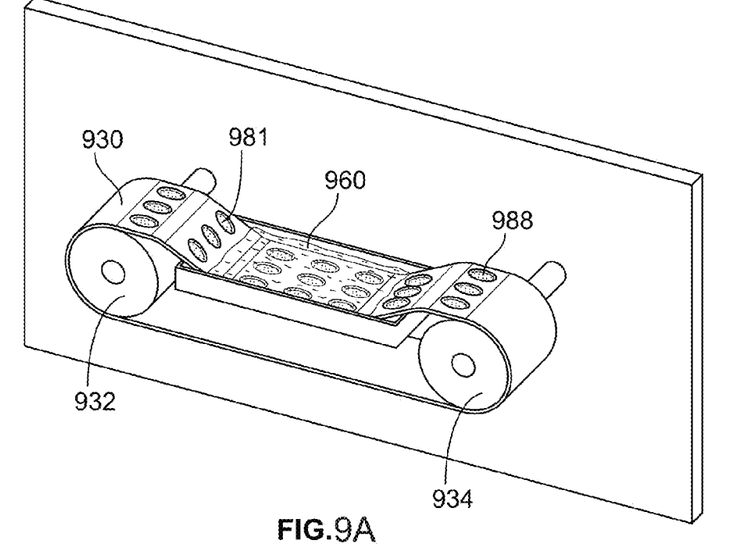
FIG. 9A depicts an apparatus for depositing compressed bodies into a bath.
Figure 9B:
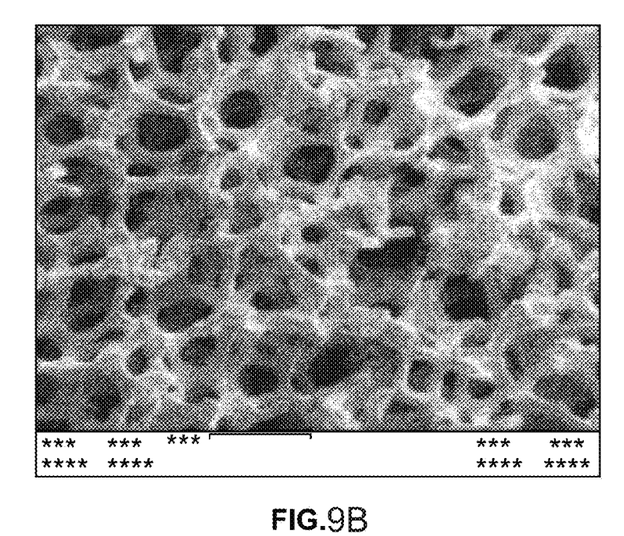
FIG. 9B depicts a possible porous coating.
Figure 9C:
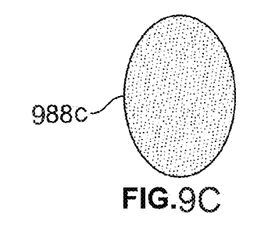
FIGS. 9C and 9D depict potential product forms.
Figure 9D:
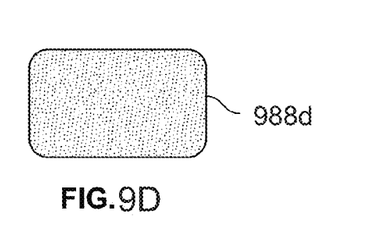

In some cases, such as shown in FIG. 9A, a foamed skin casing can be applied to compressed bodies by placing bodies 904 into a bath 960 on a conveyor 930. Bath 960 can include a foaming mixture that coats bodies 904 and creates a foam skin. Possible materials include polyurethane foam, PVC foam, Styrofoam, and combinations thereof. For example, polyurethane foam can be formed using carbon dioxide or another food grade liquid gas as a solvent. FIG. 9B depicts a porous surface of a foamed skin applied by the bath 960. FIGS. 9C and 9D depict possible product forms 908c and 908d that can be formed using this process.

Integrated Polymer Mesh Casing

Figures 10A, 10B, 10C:
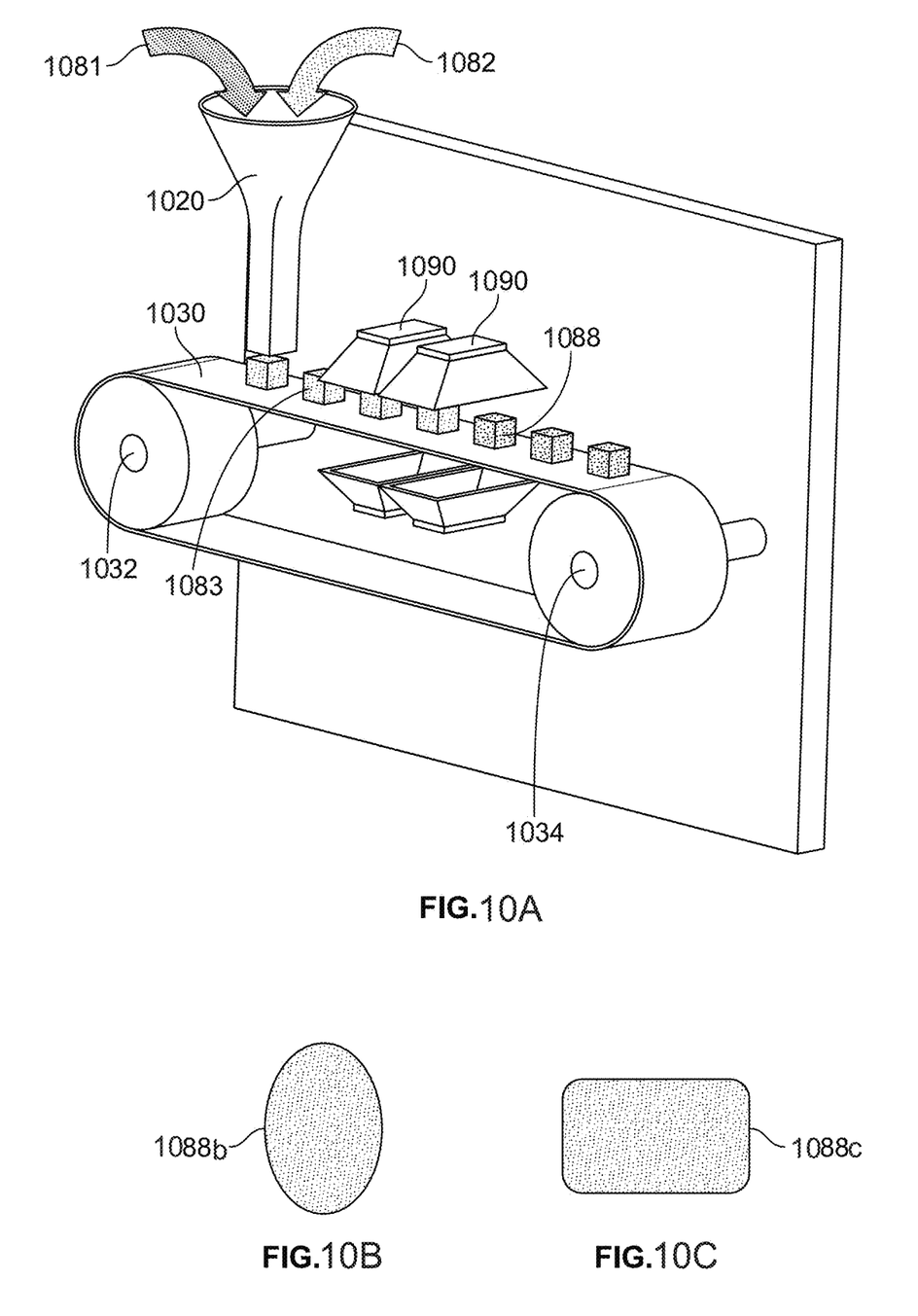
FIG. 10A depicts an apparatus for forming encased bodies of smokeless tobacco by combining thermoplastic fibers and smokeless tobacco material into a compressed body and melt bonding the thermoplastic fibers at surface of a compressed body.
FIGS. 10B and 10C depict potential product forms.

In some cases, such as shown in FIG. 10A, a mesh casing can be formed around a compressed body by including a mesh forming material in the body and selectively treating a surface of the body to create the mesh. As shown, a molding device 1020 can receive a mixture of thermoplastic polymer 1081 and smokeless tobacco 1082 (or similar material) and compress the mixture into a body 1001, which can be deposited on a conveyor 1030. Conveyor, moving between rollers 1032 and 1034, can move body 1001 under curing lamps 1090a, 1090b, 1090c, and 1090d to selectively melt bond and/or cure thermoplastic polymer along exterior surfaces of the compressed body and thus form encased body 1008. FIGS. 10B and 10C depict possible product forms 1008b and 1008c that can be formed using this process.

Polymeric Materials and Treatments

Casings provided herein can include any suitable polymer. Exemplary polymers include polypropylene, polyurethane, styrene, and/or combinations thereof. In some cases, polypropylene, polyurethane, and styrene can also be compounded together in different ratios. In some cases, polymers can be colored to provide a moist appearance and/or have hydrophilic properties that allow for wicking performance.

In some cases, casings provided herein include elastomeric polymers (e.g., polyurethane). Elastomeric polymers can provide mesh and web casings with improved elongation and toughness. In some cases, casings provided herein can provide the unique property of allowing an adult tobacco consumer to reduce or increase a packing density of an encased smokeless tobacco product, which can impact a rate of flavor release. A higher packing density can reduce a rate of flavor release. Suitable elastomeric polymers include EPAMOULD (Epaflex), EPALINE (Epaflex), TEXIN (Bayer), DESMOPAN (Bayer), HYDROPHAN (Advance-Sourse Biomaterials), ESTANE (Lubrizol), PELLETHANE (Lubrizol), PEARLTHANE (Merquinsa), IROGRAN (Huntsman), ISOTHANE (Greco), ZYTHANE (Alliance Polymers and Services), VISTAMAX (ExxonMobil), and MD-6717 (Kraton). In some cases, elastomers can be combined with polyolefins at ratios ranging from 1:9 to 9:1. For example, elastomeric polymers can be combined with polypropylene. In some cases, a blend of polyurethane, polypropylene, and styrene can be compounded and used in methods and machines provided herein.

Tobacco

Smokeless tobacco is tobacco suitable for use in an orally used tobacco product. By "smokeless tobacco" it is meant a part, e.g., leaves, and stems, of a member of the genus *Nicotiana* that has been processed. Exemplary species of tobacco include *N. rustica, N. tabacum, N. tomentosiformis, and N. sylvestris*. Suitable tobaccos include fermented and unfermented tobaccos. In addition to fermentation, the tobacco can also be processed using other techniques. For example, tobacco can be processed by heat treatment (e.g., cooking, toasting), flavoring, enzyme treatment, expansion and/or curing. Both fermented and non-fermented tobaccos can be processed using these techniques. In other embodiments, the tobacco can be unprocessed tobacco. Specific examples of suitable processed tobaccos include, dark air-cured, dark fire-cured, burley, flue cured, and cigar filler or wrapper, as well as the products from the whole leaf stemming operation. In some cases, smokeless tobacco includes up to 70% dark tobacco on a fresh weight basis.

Tobacco can be conditioned by heating, sweating and/or pasteurizing steps as described in U.S. Publication Nos. 2004/0118422 or 2005/0178398. In addition to modifying the aroma of the leaf, fermentation can change the color, texture, and other sensorial attributes (taste) of a leaf. Also during the fermentation process, evolution gases can be produced, oxygen can be taken up, the pH can change, and the amount of water retained can change. See, for example, U.S. Publication No. 2005/0178398 and Tso (1999, Chapter 1 in Tobacco, Production, Chemistry and Technology, Davis & Nielsen, eds., Blackwell Publishing, Oxford). Cured, or cured and fermented tobacco can be further processed (e.g., cut, expanded, blended, milled or comminuted) prior to incorporation into the smokeless tobacco product. The tobacco, in some cases, is long cut fermented cured moist tobacco having an oven volatiles content of between 30 and 61 weight percent prior to mixing with the polymeric material and optionally flavorants and other additives.

The tobacco can, in some cases, be prepared from plants having less than 20 µg of DVT per $cm^2$ of green leaf tissue. For example, the tobacco particles can be selected from the tobaccos described in U.S. Patent Publication No. 2008/0209586, which is hereby incorporated by reference. Tobacco compositions containing tobacco from such low-DVT varieties exhibits improved flavor characteristics in sensory panel evaluations when compared to tobacco or tobacco compositions that do not have reduced levels of DVTs.

Green leaf tobacco can be cured using conventional means, e.g., flue-cured, barn-cured, fire-cured, air-cured or sun-cured. See, for example, Tso (1999, Chapter 1 in Tobacco, Production, Chemistry and Technology, Davis & Nielsen, eds., Blackwell Publishing, Oxford) for a description of different types of curing methods. Cured tobacco is usually aged in a wooden drum (i.e., a hogshead) or cardboard cartons in compressed conditions for several years (e.g., two to five years), at a moisture content ranging from 10% to about 25%. See, U.S. Pat. Nos. 4,516,590 and 5,372,149. Cured and aged tobacco then can be further processed. Further processing includes conditioning the tobacco under vacuum with or without the introduction of steam at various temperatures, pasteurization, and fermentation. Cure, aged, and fermented smokeless tobacco can be further processed (e.g., cut, shredded, expanded, or blended). See, for example, U.S. Pat. Nos. 4,528,993; 4,660,577; and 4,987,907.

The smokeless tobacco can be processed to a desired size. For example, long cut smokeless tobacco typically is cut or shredded into widths of about 10 cuts/inch up to about 110 cuts/inch and lengths of about 0.1 inches up to about 1 inch. Double cut smokeless tobacco can have a range of particle sizes such that about 70% of the double cut smokeless tobacco falls between the mesh sizes of −20 mesh and 80 mesh. Other lengths and size distributions are also contemplated.

The smokeless tobacco can have a total oven volatiles content of about 10% by weight or greater; about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight. Those of skill in the art will appreciate that "moist" smokeless tobacco typically refers to tobacco that has an oven volatiles content of between about 30% by weight and about 61% by weight (e.g., about 45% by weight to about 55% by weight, or about 50% by weight). As used herein, "oven volatiles" are determined by calculating the percentage of weight loss for a sample after drying the sample in a pre-warmed forced draft oven at 110° C. for 3.25 hours. The encased smokeless tobacco product can have a different overall oven volatiles content than the oven volatiles content of the smokeless tobacco used to make the encased smokeless tobacco product. The processing steps described herein can reduce or increase the oven volatiles content. The overall oven volatiles content of the encased smokeless tobacco product is discussed below.

The encased smokeless tobacco product can include between 15 weight percent and 85 weight percent smokeless tobacco on a dry weight basis. The amount of smokeless tobacco in encased smokeless tobacco product on a dry weight basis is calculated after drying the product in a pre-warmed forced draft oven at 110° C. for 3.25 hours. The remaining non-volatile material is then separated into tobacco material and polymeric material. The percent smokeless tobacco in the encased smokeless tobacco product is calculated as the weight smokeless tobacco divided by the total weight of the non-volatile materials. In some cases, the encased smokeless tobacco product includes between 20 and 60 weight percent tobacco on a dry weight basis. In some cases, the encased smokeless tobacco product includes at least 28 weight percent tobacco on a dry weight basis. In some cases, enrobed product portions produced in methods and/or machines provided herein can be rewet with water and/or a solution of flavorants, sweeteners, and/or other additives discussed herein to wick the coating of polymeric fibers, provide a moist appearance, prove a flavor immediately, and/or to increase a flavor intensity.

In some cases, a plant material other than tobacco is used as a tobacco substitute in the pouched products made using machines and methods provided herein. The tobacco substitute can be an herbal composition. Herbs and other edible plants can be categorized generally as culinary herbs (e.g., thyme, lavender, rosemary, coriander, dill, mint, peppermint) and medicinal herbs (e.g., Dahlias, Cinchona, Foxglove, Meadowsweet, Echinacea, Elderberry, Willow bark). In some cases, the tobacco is replaced with a mixture of non-tobacco plant material. Such non-tobacco compositions may have a number of different primary ingredients, including but not limited to, tea leaves, red clover, coconut flakes, mint leaves, ginseng, apple, corn silk, grape leaf, and basil leaf. The plant material typically has a total oven volatiles content of about 10% by weight or greater; e.g., about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight.

Flavorants and Additives

Flavors and other additives can be included in the compositions and arrangements described herein and can be added to the encased smokeless tobacco product at any point in the process. For example, any of the initial components, including the polymeric material, can be provided in a flavored form. In some cases, flavorants and/or other additives are included in the smokeless tobacco. In some cases, flavorants and/or other additives are absorbed into to the encased smokeless tobacco product after pouching. In some cases, flavorants and/or other additives are mixed with the polymeric material (e.g., with structural fibers) prior to melt-blowing the fibers and/or as the fibers exit the spinnerets.

Suitable flavorants include wintergreen, cherry and berry type flavorants, various liqueurs and liquors such as Drambuie, bourbon, scotch, whiskey, spearmint, peppermint, lavender, cinnamon, cardamom, apium graveolents, clove, cascarilla, nutmeg, sandalwood, bergamot, geranium, honey essence, rose oil, vanilla, lemon oil, orange oil, Japanese mint, cassia, caraway, cognac, jasmine, chamomile, menthol, ilangilang, sage, fennel, piment, ginger, anise, coriander, coffee, liquorish, and mint oils from a species of the genus *Mentha*. Mint oils useful in particular embodiments of the encased smokeless tobacco products include spearmint and peppermint.

Flavorants can also be included in the form of flavor beads, which can be dispersed within the encased smokeless tobacco product (e.g., in a nonwoven network of polymeric structural fibers). For example, the encased smokeless tobacco product could include the beads described in U.S. Patent Application Publication 2010/0170522, which is hereby incorporated by reference.

In some cases, the amount of flavorants in the encased smokeless tobacco product is limited to less than 30 weight percent in sum. In some cases, the amount of flavorants in the encased smokeless tobacco product can be limited to be less than 5 weight percent in sum. For example, certain flavorants can be included in the encased smokeless tobacco product in amounts of about 3 weight percent.

Other optional additives can include but are not limited to fillers (e.g., starch, dicalcium phosphate, lactose, sorbitol, mannitol, and microcrystalline cellulose), soluble fiber (e.g., Fibersol from Matsushita), calcium carbonate, dicalcium phosphate, calcium sulfate, and clays), sodium chloride, lubricants (e.g., lecithin, stearic acid, hydrogenated vegetable oil, mineral oil, polyethylene glycol 4000-6000 (PEG), sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides)), plasticizers (e.g., glycerine, propylene glycol, polyethylene glycol, sorbitol, mannitol, triacetin, and 1,3 butane diol), stabilizers (e.g., ascorbic acid and monosterol citrate, BHT, or BHA), artificial sweeteners (e.g., sucralose, saccharin, and aspartame), disintegrating agents (e.g., starch, sodium starch glycolate, cross caramellose, cross linked PVP), pH stabilizers, or other compounds (e.g., vegetable oils, surfactants, and preservatives). Some compounds display functional attributes that fall into more than one of these categories. For example, propylene glycol can act as both a plasticizer and a lubricant and sorbitol can act as both a filler and a plasticizer.

Oven volatiles, such as water, may also be added to the encased smokeless tobacco product to bring the oven volatiles content of the encased smokeless tobacco product into a desired range. In some cases, flavorants and other additives are included in a hydrating liquid.

Oven Volatiles

The encased smokeless tobacco product can have a total oven volatiles content of between 10 and 61 weight percent. In some cases, the total oven volatiles content is at least 40 weight percent. The oven volatiles include water and other volatile compounds, which can be a part of the tobacco, the polymeric material, the flavorants, and/or other additives. As used herein, the "oven volatiles" are determined by calculating the percentage of weight loss for a sample after drying the sample in a pre-warmed forced draft oven at 110° C. for 3.25 hours. Some of the processes may reduce the oven volatiles content (e.g., heating the composite or contacting the smokeless tobacco with a heated polymeric material), but the processes can be controlled to have an overall oven volatiles content in a desired range. For example, water and/or other volatiles can be added back to the encased smokeless tobacco product to bring the oven volatiles content into a desired range. In some cases, the oven volatiles content of the composite encased smokeless tobacco product is between 50 and 61 weight percent. For example, the oven volatiles content of smokeless tobacco used in the various processed described herein can be about 57 weight percent. In other embodiments, the oven volatiles content can be between 10 and 30 weight percent.

Other Embodiments

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed

What is claimed is:

1. A method of making a polymer encased smokeless tobacco or tobacco substitute product comprising:
    forming a compressed body including smokeless tobacco, a tobacco substitute, or a combination thereof;
    placing the compressed body in a first tubular member having a first side wall defining a plurality of fenestrations;
    reducing a diameter of said first tubular member to secure said first tubular member to said compressed body to form a partially covered body having uncovered ends;
    placing said partially covered body in a second tubular member having a second side wall defining a plurality of fenestrations, said uncovered ends being positioned against said second side wall;
    reducing a diameter of said second tubular member to secure said second tubular member to said partially covered body to form a fully covered body; and
    heating said covered body to melt bond said first and second tubular members together around said compressed body to form an encased body.

2. The method of claim 1, further comprising hydrating said encased body to form an encased product having greater than 10 weight percent oven volatiles.

3. The method of claim 1, wherein the diameter of said first or second tubular member is reduced by heating said tubular member.

4. The method of claim 3, wherein reducing the second tubular member and melt-bonding said second tubular member comprises a heating process.

5. The method of claim 1, wherein the diameter of said first or second tubular member is reduced elongating said first or second tubular member.

6. The method of claim 1, wherein said first or second tubular members comprise polyurethane.

7. A method of making a polymer encased smokeless tobacco or tobacco substitute product comprising:
    forming a compressed body including smokeless tobacco, a tobacco substitute, or a combination thereof;
    placing the compressed body in a first tubular member having a first side wall defining a plurality of fenestrations;
    reducing a diameter of said first tubular member to secure said first tubular member to said compressed body to form a partially covered body having uncovered ends;
    placing said partially covered body in a second tubular member having a second side wall defining a plurality of fenestrations, said uncovered ends being positioned against said second side wall; and
    reducing a diameter of said second tubular member to secure said second tubular member to said partially covered body to form a fully covered body.

8. The method of claim 7, further comprising curing said covered body to bond said first tubular member, second tubular member, or both, around said compressed body to form an encased body.

9. The method of claim 7, further comprising hydrating said encased body to form an encased product having greater than 10 weight percent oven volatiles.

10. The method of claim 7, wherein the diameter of said first or second tubular member is reduced by heating said tubular member.

11. The method of claim 8, wherein the curing comprises using UV energy to bond said first tubular member, second tubular member, or both, around said compressed body.

12. The method of claim 7, wherein the diameter of the first or second tubular member is reduced by elongating said first or second tubular member.

13. The method of claim 7, wherein the first or second tubular member comprises PE, PP, or combinations thereof.

14. The method of claim 7, wherein the first or second tubular member comprises foamed PE, PP, or combinations thereof.

15. The method of claim 7, wherein the first or second tubular member comprises polyurethane.

16. The method of claim 7, wherein the first or second tubular member is UV cured or heat cured.

* * * * *